Oct. 9, 1934. H. E. CULLEN ET AL 1,976,007

WATER COOLER

Original Filed Nov. 4, 1931

INVENTORS
HARRY E. CULLEN
HENRY O. RONNING

By
ATTORNEYS

Patented Oct. 9, 1934

1,976,007

UNITED STATES PATENT OFFICE 1,976,007

WATER COOLER

Harry E. Cullen and Henry O. Ronning, Minneapolis, Minn., assignors to Henry P. Watson, Minneapolis, Minn.; Alfred F. Pillsbury and Bessie Watson executors of said Henry P. Watson, deceased Original application November 4, 1931, Serial No. 572,971. Divided and this application September 2, 1932, Serial No. 631,539

12 Claims. (Cl. 62—143)

This invention relates to improvements in drinking water coolers, and is divisional of our copending application for Water coolers, Serial Number 572,971, filed November 4, 1931.

The structure to which this invention is applied includes a chamber having a water dispensing receptacle therein, to which refrigerating effects are to be applied. It is, of course, highly desirable to insulate the receptacle to reduce cold losses to a minimum. Objects of the invention are, therefore: to provide an improved structure for heat insulating the water reservoir and chamber containing it; to provide cover means which acts as an insulating means; to provide a double-walled cover structure for furnishing a dead air space; to utilize the cover-forming elements to secure a water bottle gasket in operative position; and generally to provide an efficient device for all the purposes disclosed herein.

Features of the invention include all details of construction disclosed, as well as the assembly arrangement of the parts, along with the broader ideas of means inherent in the disclosure.

Figure 1:
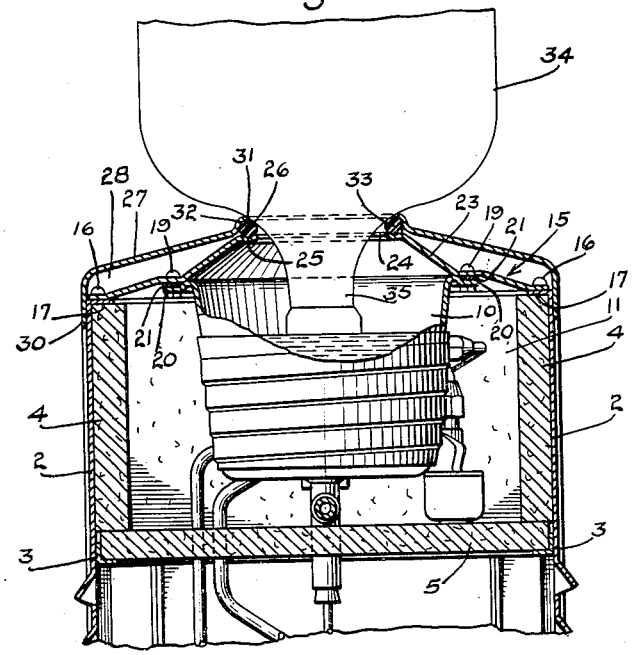
Figure 2:
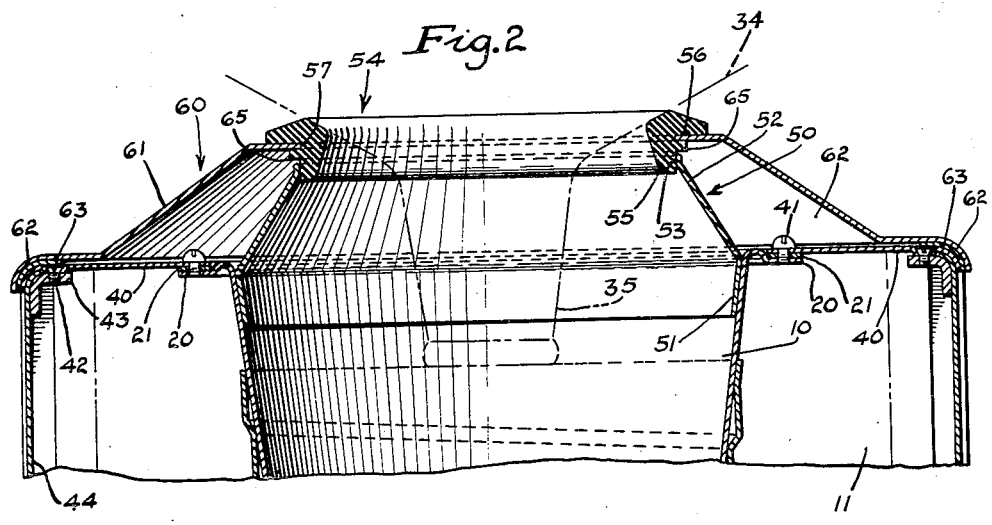

Objects, features and advantages of the invention will be set forth in the description of the drawing forming a part of this application, and in said drawing Figure 1 is a vertical section illustrating one embodiment of the invention; and Figure 2 is a similar section illustrating a modification.

In this instance, a main housing is formed of vertically disposed sheet metal plates 2 suitably secured by means, not herein shown, to form a tubular casing. The casing has horizontally disposed angle irons 3 to provide a ledge for a bottom of a chamber which is lined with slabs 4 of heat insulating material. A slab 5 of the same material forms the bottom of the chamber and is supported by the angle irons 3, as shown. The particular structure of the refrigeration chamber is not herein claimed.

The drinking water dispensing receptacle is indicated at 10 and is arranged within the refrigeration chamber 11. This receptacle 10 is spaced from the walls of the chamber 11, and suitable insulating sheathing, not shown, is usually wrapped or packed about the receptacle. A cover element is indicated at 15, see Figure 1, and is connected to the casing as at 16, to the in-turned flanges 17 of the sides 2. This element 15 is also connected by bolts 19 to a flange 20 of the water receptacle 10. The cover element 15 thus sealingly engages the walls of the outer casing as well as the wall of the water receptacle, and bridges the space between the walls of the chamber and receptacle. A gasket 21 is interposed between the flange 20 and the cover 15, as shown. The cover element 15 has an upwardly convergent central tubular conical portion 23 which has an opening 24 surrounded by a marginal depression 25 which receives and sockets the gasket 26.

A plate 27 forming one wall of the cover means is spaced therefrom to provide a dead air chamber 28 and this plate or cover section has a downwardly turned portion or flange 30 which detachably but sealingly engages the outer wall of the main casing as a lid. Plate 27 also acts with the plate 15, as means for clampingly securing the gasket 26 in operative position. The plate is provided with an opening 31 and provides a marginal socket 32 which receives the gasket and compressively engages its upper portion. A portion 33 of the gasket is exposed to be sealingly engaged by the neck end of a bottle 34, the neck 35 extending through the gasket into the water receptacle 10 in the usual manner.

In Figure 2, a modified form of heat insulating cover for the receptacle and its receiving chamber is shown. This construction is adapted to be readily disassembled for cleaning purposes. To this end, the water receptacle 10 is provided, as in the first form, with a flange 20 and gasket 21 resting on the flange. Attached compressively against this gasket and secured to the flange 21 by means of screws 41 is a plate 40, the outer portion of which is attached by screws 42 to clips or angle irons 43. The outer margins of the plate 40 are curved to conform to the upper curved extremities of the side plates 44 of the housing.

A tubular stopper-like cover for the receptacle is indicated at 50 and provides a tapering portion 51 sealingly engaging within the receptacle 10 as a stopper, and also provides the upwardly convergent conical portion 52 providing an opening 53. Fitted within the opening as a stopper, is a water bottle gasket 54, which has a reduced portion 55, forming the stopper. The gasket is peripherally circumferentially grooved as at 56 to receive the marginal portions of an opening 57 of a wall-forming member 60 of the cover means. The upper end of the gasket overlies the upper surface of this member 60 as shown. The member 60 is tubular and provides an upwardly convergent conical portion 61 spaced from the sides of the stopper element 50, and said member 60 forms with the cover 50 and the plate 40 a dead air space 62 adapted to oppose heat conduction to the chamber 11. The member 60 has a downwardly curved marginal portion or flange 62 which engages a gasket 63 lying on top of the plate 40. A closed and sealed dead air space 62 is thus formed substantially in the manner of the first described form, but assembly and disassembly are much facilitated by this construction.

A shoulder 65 of the gasket is engageable with the top of the upper edge or rim of element 50, to form an additional seal. Although not so shown, the gasket can be and generally is compressed between elements 50—60.

We claim as our invention:

1. A chamber having walls of heat insulating material and having therein a receptacle, a first tubular cover having a stopper-like fit with the receptacle, a second cover attached to the receptacle and closing the chamber, a gasket supported by the first cover and surrounding its open top, and means for securing the gasket in operative position including a wall-forming element which is spaced from and forms with said covers a dead air space adapted to oppose heat conduction to the chamber and receptacle, said element having a marginal frictional fit with the chamber walls and said gasket having a circumferentially continuous portion exposed to be sealingly engaged by the neck end of a bottle, when the bottle is positioned to empty into the receptacle.

2. A chamber having therein a receptacle, cover means for the receptacle and chamber having an opening opposed to the receptacle, a gasket supported by the cover means, and means for rigidly clamping the gasket in operative position including an element which forms with the cover means a dead air space adapted to oppose heat conduction to chamber and receptacle, a circumferentially continuous portion of the gasket being exposed to be sealingly engaged by a bottle.

3. A chamber having therein a receptacle, cover means for the receptacle and chamber, including a tubular stopper fitting the receptacle, a gasket having a stopper fit with the tubular stopper, and means for securing the gasket in operative position including an element which forms with the cover means a dead air space adapted to oppose heat conduction to chamber and receptacle, a circumferentially continuous portion of the gasket being exposed to be sealingly engaged by a bottle.

4. A chamber having therein a receptacle, cover means for the receptacle and chamber, including a tubular stopper fitting the receptacle, a gasket sealingly engaging the stopper and means for securing the gasket in operative position including an element which forms with the cover means a dead air space adapted to oppose heat conduction to chamber and receptacle, means interlocking the gasket to the last mentioned means for removal therewith, a circumferentially continuous portion of the gasket being exposed to be sealingly engaged by a bottle.

5. A chamber having a receptacle, cover means for the receptacle and chamber, an element which forms with the cover means a dead air space adapted to oppose heat conduction to chamber and receptacle, said cover and element having means cooperative to rigidly secure an annular gasket against motion in any direction and so that it forms a seal to assist in maintaining the dead air space, and in position to support the neck of an inverted bottle in position to deliver into the receptacle.

6. A chamber having therein a receptacle, means forming a dead air space to prevent heat conduction to the chamber and receptacle, including two elements which cooperate to clamp an annular gasket in opposition to the receptacle in a manner to form a sealed wall for the dead air space, and provide a support for the neck of an inverted bottle.

7. A chamber having a receptacle therein, means forming a dead air space to prevent heat conduction to the chamber and receptacle, including two elements which cooperate to secure an annular gasket in opposition to the receptacle in a manner to utilize the gasket as part of the means for maintaining the seal for the dead air space, and to support the neck of an inverted bottle, said receptacle having a circumscribing marginal flange extending outwardly from its top and one of said elements being circumferentially sealingly engaged with said flange.

8. A chamber having a receptacle therein, means forming a dead air space to prevent heat conduction to the chamber and receptacle including two elements which cooperate to clampingly secure an annular gasket in opposition to the receptacle in a manner to utilize the gasket as part of the means for maintaining the seal for the dead air space and to support the neck of an inverted bottle, said receptacle having a marginal flange at its top, said flange having a bead, and one of the elements being circumferentially sealingly engaged with said flange and bead.

9. In a water cooling and dispensing apparatus a structure providing a refrigeration chamber, a water receptacle in said chamber, a first annulus covering the chamber and receptacle and sealingly engaged with the walls of both, an annular gasket supported by the annulus to support an inverted bottle to empty into the receptacle, and a second annulus spaced from the first to form therewith a dead air chamber and sealingly associated with the gasket, and other annulus, said annuli overlapping said gasket at the top and bottom.

10. A chamber having therein a receptacle, means forming a dead air space to prevent heat conduction to the chamber and receptacle, including a first annulus sealingly engaging the receptacle and chamber wall and covering the chamber, a second annulus sealingly engaging the receptacle, an annular gasket supported by the second annulus in opposition to the receptacle to provide a support for the neck of an inverted bottle, and a third annulus sealingly engaging the annular gasket and first annulus, and forming with the other annuli a dead air space.

11. A structure providing a chamber having a receptacle therein, a first cover annulus sealingly engaged with the receptacle and structure and covering the chamber, an annular gasket on said first annulus adapted to support an inverted bottle having its neck delivering into the receptacle through said annulus, and a second cover annulus forming with the first a dead air space, and sealingly engaging the gasket and structure, said cover and annuli having portions clampingly securing said gasket in operative position.

12. A structure providing a chamber having a receptacle therein having an annular extension, a cover for the chamber spaced from said extension and having an opening, a gasket and means sealingly locking it in said opening for removal with the cover to serve as a support for an inverted bottle positioned to empty into the receptacle through the annular extension, said gasket having a portion sealingly but detachably engaged with said extension, and means associated with said receptacle, structure, cover and the extension to define a dead air space.

HARRY E. CULLEN.
HENRY O. RONNING.